UNITED STATES PATENT OFFICE.

LUDWIG N. WEISSMANN, OF NEW YORK, N. Y.

PLASTIC MOLDING COMPOSITION.

1,256,621.  Specification of Letters Patent.  Patented Feb. 19, 1918.

No Drawing.  Application filed October 31, 1917.  Serial No. 199,429.

*To all whom it may concern:*

Be it known that I, LUDWIG N. WEISSMANN, a native of Hungary, have declared my intention of becoming a citizen of the United States, and a resident of the borough of Manhattan, city, county, and State of New York, and have invented a new and useful Plastic Molding Composition, of which the following is a specification.

The object of my invention is the production of a plastic composition for molding purposes that will quickly congeal and set into a hard, tenaceous, homogeneous product of great strength and rigidity combined with lightness of weight,—a product that is practically unbreakable and indestructible under ordinary conditions of use, and adapted to the formation of heads and other parts of dolls and toys, statuettes, buttons, and various other commercial commodities in which durability is an important pre-requisite.

My composition consists primarily and essentially of a mixture of paper pulp in comminuted form, plaster of Paris, and vegetable glue as a binding vehicle, coloring matter being added if desired, and shellac if it is desired to render the composition inherently waterproof.

In the preparation of the composition I prefer to use the ingredients in about the following proportions,—viz., one quarter pound of comminuted paper pulp, one eighth of a pound of plaster of Paris, and one half a pound of vegetable glue, although the relative proportions of the ingredients may be varied somewhat without departing from the spirit and intent of my invention, and without materially altering the results attained.

In the formula above given the vegetable glue is dissolved in about three pints of boiling water, and the other ingredients added indiscriminately, in such manner as to attain a thorough admixture of all.

One quarter of a pound of a suitable coloring matter may be added if desired, and also a couple of ounces of shellac if it is desired to render the composition indissoluble, but the use of both the coloring matter and the shellac is optional, and dependent upon the purpose for which the product is intended.

In any case the resultant composition is essentially fire-proof, and of a hard, tenacious character, although of relatively light weight.

The semi-fluid or plastic composition thus attained must be used as soon as prepared, as it congeals rapidly and sets in the mold almost immediately after introduction therein, so that it may be removed therefrom without delay, although it takes about twenty four hours in which to attain its maximum degree of hardness and strength.

My composition is of light weight, is fireproof, a non-conductor of both heat and electricity, may be made impervious to water, is strong and tenacious of structure, and is adapted to various uses and applications in the arts and manufactures, besides being comparatively inexpensive and easy to manipulate.

By the term vegetable glue as used herein I mean glue made from casein, tapioca flour, etc., in contradistinction to glue made from sinew, skin, bones and other animal matter, since I have ascertained by actual experience and experimental investigation that animal glue is not the equivalent of such animal glue as an ingredient of my plastic vegetable glue composition, lacking the absorbent molding qualities of the vegetable glue which congeals the whole composite mass into an integral, homogeneous structure.

What I claim as my invention and desire to secure by Letters Patent is,

1. A plastic composition of the character designated, comprising vegetable glue made from casein, tapioca, etc., comminuted paper pulp, and plaster of Paris, substantially as set forth.

2. A plastic composition of the character designated, comprising vegetable glue made from casein, tapioca, etc., comminuted paper pulp, plaster of Paris and coloring matter, substantially as set forth.

3. A plastic composition of the character designated, comprising vegetable glue made from casein, tapioca, etc., comminuted paper pulp, plaster of Paris and shellac, substantially as set forth.

4. A plastic composition of the character designated, comprising vegetable glue made from casein, tapioca, &c., comminuted paper pulp, plaster of Paris, coloring matter, and shellac, substantially as set forth.

LUDWIG N. WEISSMANN.

Witnesses:
 MORRIS KOHN,
 GEO. WM. MIATT.